Feb. 3, 1970 P. P. SEMIENKO 3,493,945
PLATED WIRE MAGNETIC MEMORY WITH A UNIFORM
FIELD ALONG THE STORAGE ELEMENT
Filed Aug. 31, 1966 2 Sheets-Sheet 1

INVENTOR
PETER P. SEMIENKO
BY Richard J. Donoghue
ATTORNEY

INVENTOR
PETER P. SEMIENKO

BY Richard J. Donahue
ATTORNEY

United States Patent Office 3,493,945

Patented Feb. 3, 1970

3,493,945
PLATED WIRE MAGNETIC MEMORY WITH A UNIFORM FIELD ALONG THE STORAGE ELEMENT

Peter P. Semienko, Roslindale, Mass., assignor to Honeywell Inc., Minneapolis, Minn., a corporation of Delaware Filed Aug. 31, 1966, Ser. No. 576,435
Int. Cl. G11b 5/00
U.S. Cl. 340—174 4 Claims

ABSTRACT OF THE DISCLOSURE

A plated wire magnetic memory has pairs of word straps connected in series and disposed relative to a magnetically coated conductor to develop a relatively uniform field along a bit storage element of the conductor which the pair of straps crosses, and to essentially terminate the field beyond that element of the conductor.

The present invention relates in general to a magnetic storage device for digital data and more particularly to an improved plated wire memory.

Plated wire memories, per se, are well known and have been extensively described in numerous publications. Basically, a plated wire memory consists of a number of electrically conductive wires, commonly termed digit or bit (binary digit) wires, having a thin continuous magnetic film electroplated thereon. The magnetic film possesses a uniaxial anisotropy whereby axial segments thereof assume a selected one of two stable directions of remanent magnetization, either clockwise or counterclockwise about the wire circumference. A number of solenoidal conductors, commonly called word lines, perpendicularly surround the plate wires to define axial segments on said plated wires which form discrete storage locations for digital data.

In many plated wire memories the aforesaid word line conductors consist of flat, single-turn copper straps hereinafter called word straps. Plated wire memories having word straps of rectangular cross-section are preferable to memories having word line conductors or circular cross-section since they are more reliable in operation. In addition, word straps offer a cheaper method of fabrication since they can be etched on a non-conductive substrate web.

Although single-turn word strap plated wire memories are superior to those using circular cross-section conductors, they are nevertheless inefficient in operation and have a small data storage capacity per unit area. It is known, for example, that the intensity of the magnetic field formed about a flat word strap, for a given value of applied current, varies inversely with the width of the strap. Thus, a single-turn strap must be as small as practical, in order to increase the field-forming efficiency of the word driver current. However, as the width of the word strap is decreased, the intensity of the magnetic field attributable to it decreases rapidly from the center on out. Consequently, with narrow, single-turn word straps, the word strap field, while efficiently generated and of a high value at the center of the strap may, for a given word driver current, be incapable of producing the desired magnetic rotation throughout the entire length of a bit storage segement. Thus, only a small portion of the bit storage segment will be magnetically switched by the word strap field and the sensed output signal therefrom will be of low amplitude.

If, on the other hand, the width of the single-turn word strap is increased to provide a more uniform magnetic field throughout a bit storage segment, the intensity of the field, for the same value of word driver current, is greatly decreased. In order to compensate for this reduction in the efficiency of the word driver current in generating a magnetic field, it is then necessary to increase the power capability of the word current driver and selection circuitry, at considerable expense. Additional problems now arise in the form of high power dissipation and high level noise signal generation within the memory system. In addition, the more uniform field thus formed across the width of the single-turn word strap does not terminate abruptly at the edges of the word strap, but remains at a high value for a considerable distance on either side thereof. It is therefore necessary to provide increased spacing between adjacent word straps so as to avoid a spurious interrogation of adjacent, non-selected, bit storage segements. Having increased the separation between adjacent word straps, the bit storage capacity of the memory is accordingly reduced.

It is therefore an object of the present invention to provide an improved plated wire memory which is not subject to the foregoing disadvantages.

It is another object of the present invention to provide a plated wire memory having a high word current efficiency as well as a high bit storage density.

It is a further object of the present invention to provide a plated wire memory having an improved word strap configuration.

The various novel features which characterize the invention will become apparent from the following detailed specification and are pointed out with particularity in the claims annexed to and forming a part thereof. For a better understanding of the invention, its advantages and specific objects thereof, reference should be made to the accompanying drawing in which:

Figure 1:
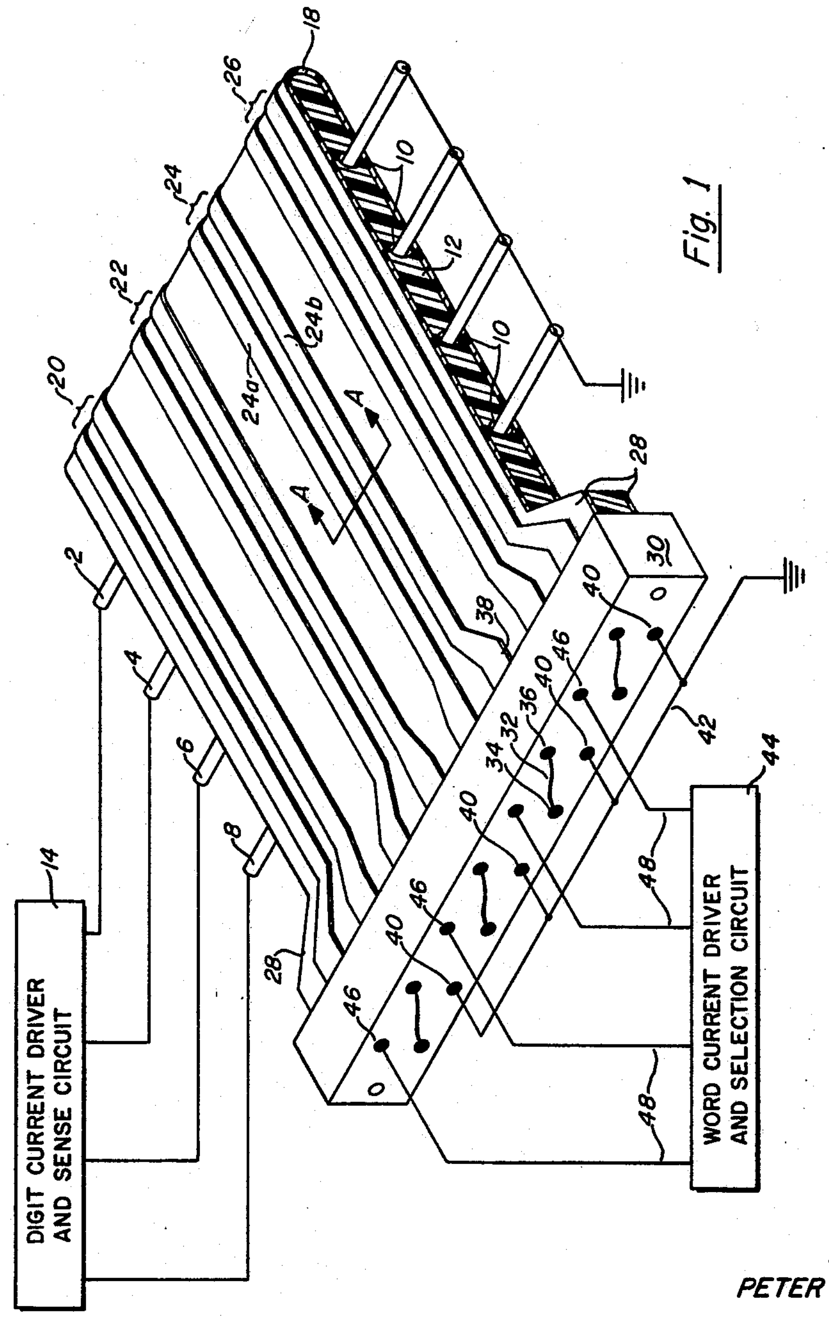
FIGURE 1 illustrates a preferred embodiment of the present invention.

Referring now to FIGURE 1 of the drawings, there is illustrated a plated wire memory having four bit wires 2, 4, 6 and 8, each consisting of an electrically conductive wire having an anisotropic magnetic film electroplated thereon and positioned within the tunnels 10 formed in a non-conductive, non-magnetic support member 12. One end of each of the bit wires 2–8 inclusive is coupled to a ground reference terminal while the other ends of the bit wires are coupled to a combined digit current driver and sense circuit 14. A word strap assembly consisting of a U-shaped non-conductive web 18 having pairs of parallel conductors 20, 22, 24 and 26 formed thereon, is seen to envelope support member 12. The conductor pair 24, for example, includes a first conductor 24*a* and a second conductor 24*b* closely spaced and parrallel thereto. The conductor pairs may be formed on the web 18 by well-known etched circuit techniques and they are equally spaced across the width of the U-shaped web. The end portions 28 of the web 18 are enlarged in width and flare outwardly. The ends of the conductor pairs 20 to 26 are similarly enlarged and form upper and lower superimposed contact strips. The end portions 28 of web 18 are inserted into a conventional printed circuit connector 30 whose contact terminals 32 to 46 are adapted to connect the conductors within each pair in series to form a plurality of separate two-turn word straps.

Thus, for example, the lead 32 bridges the connector terminals 34 and 36 to electrically connect the lower contact of conductor 24*a* (not visible in the drawing) to the upper contact 38 of conductor 24*b*. The conductors in the remaining conductor pairs are similarly connected in series by means of appropriate connector terminals. One end contact of each two-turn word strap is connected to ground by means of its connector terminal 40 and the lead 42. The other end contact of each two-turn word strap is coupled to a combined word current driver and selection circuit 44 by means of its connector terminal 46 and a lead 48.

An operational cycle of the plated wire memory described above consists of a read operation and a write operation. During a read operation, a word current pulse generated within the word current driver and selection circuit 44 is coupled to a selected one of the two-turn word straps 20–26. A word current magnetic field is established about each conductor of the selected two-turn word strap, e.g. strap 24. Since each conductor **24*a* and 24*b* of the selected two-turn strap 24 is positioned on opposite sides of all of the wires 2 to 8, and is perpendicular thereto, it establishes a magnetic field in a direction along each wire axis within each bit storage segment defined by the strap. As previously explained, each bit storage segment has a vector of remanent circumferential magnetization which is either clockwise or counterclockwise. The magnetic field applied by the selected strap 24 now rotates the magnetization vector within the bit storage segments defined therebelow on each of the plated wires 2–8 into an axial direction. In so doing, it induces a signal in each of the bit wires 2–8 whose polarity is sensed by the sense circuit portion of the digit current driver and sense circuit 14**. The polarity of each of the sensed signals is indicative of the binary information stored within its interrogated bit storage segment.

During a write operation, a digit current pulse is concurrently applied to each of the plated wires 2–8 by means of the digit current driver 14. This current is applied in a direction in each bit wire related to the value of the binary digit to be stored and establishes a corresponding circumferential digit current field about each wire. The combined action of the axial word current field and the small circumferential digit current field shifts the magnetic field vector within each bit storage segment defined by the strap 24 into a direction such that when the word current is terminated, the magnetic anisotropy in the film causes the bit storage segments to assume a preferred remanent circumferential direction of magnetization indicative of the stored binary digit.

Figure 2:
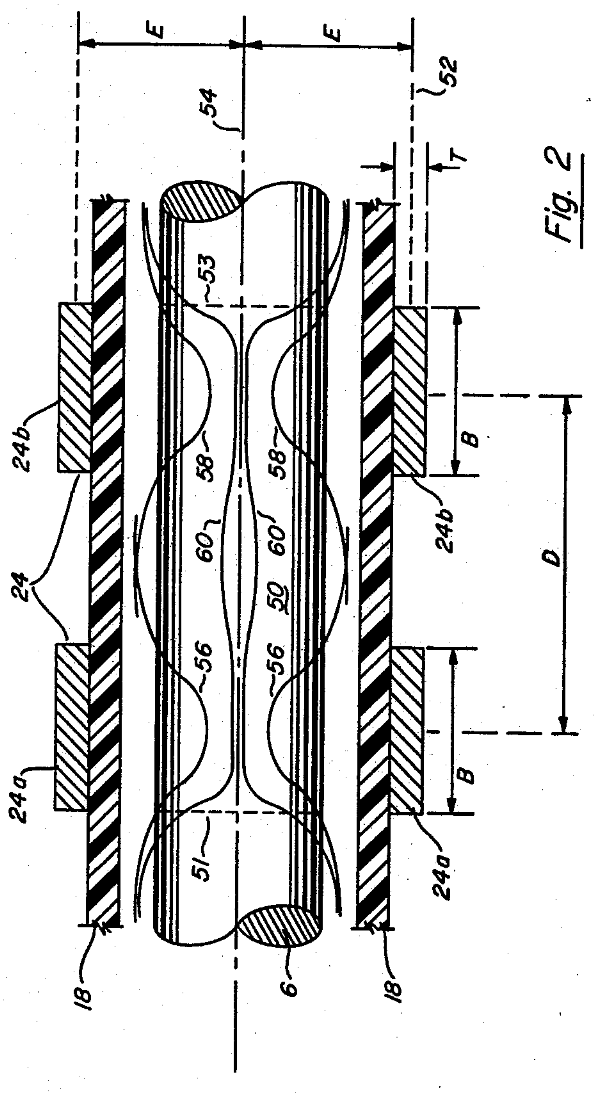
FIGURE 2 illustrates in cross-section pertinent portions of the plated wire memory shown in FIGURE 1.

In contrast to memory devices of this type having single-turn word straps, the memory described above exhibits a marked improvement in efficiency and data storage capacity. This will become clear with reference to FIGURE 2 which shows in cross-section pertinent portions of the plated wire memory in FIGURE 1 taken along the line A—A. The two-turn word strap 24 is shown here in cross-section as it is positioned about the bit wire 6. The word strap conductors **24*a* and 24*b* are shown to have a width B, a center-to-center spacing D, a thickness T, and a mean separation from the bit wire 6 (from the axis 52 of their thickness dimension T to the axis 54 of the bit wire 6) labeled E. The two-turn word strap 24 thus defines a bit storage segment whose axial length within the dotted lines 51 and 53** is a function of the conductor width B and the center-to-center spacing D.

When current is applied to the serially connected conductors of the word strap 24, each conductor has a magnetic field formed therebelow as illustrated by the curves 56 and 58. It will be noted that the individual magnetic fields 56 and 58 provided below the conductors **24*a* and 24*b* respectively, vary markedly in intensity throughout their width B. It is a feature of the present invention to compensate for such non-uniformity of the magnetic field distribution in prior art plated wire memories using single-turn straps. This is effected in the present invention by providing structure wherein the width of the two-turn word strap conductors, their center-to-center spacing, and their separation from the bit wires are related such that the individual magnetic fields of each conductor overlap and are additive to provide a substantially uniform field, as shown by the curves 60. Not only is the resultant field uniform within the bit storage segment 50, but it is concentrated and confined within the bit storage segment so that its intensity drops rapidly on either side thereof. Moreover, the individual conductors, being of a small width, form a highly efficient magnetic field. Thus, a plated wire memory having superior characteristics is provided by the invention. It has been mathematically determined and experimentally verified that the resultant magnetic field 60 can be made substantially uniform throughout the length of the bit storage segment 50 if the width B of the word strap conductors, their center-to-center spacing D, and their means separation from the bit wire axis E are dimensioned in accordance with the following relationship: $D=\sqrt{B^2+4E^2}$. The width of the conductors B and the spacing parameter E are advantageously chosen to be as small as possible, in order to preserve the efficiency of each conductor in a pair in forming a high efficiency field and to provide an efficient coupling of the field to the bit storage segment. A practical limitation of the width parameter might be the minimum reliable etching width of the word strap conductors while the spacing parameter E will be limited by the minimum thickness of the web 18**.

In a practical embodiment of the present invention the dimension B and E were each 5 mils (.005 inch) while the center-to-center spacing D of the conductors forming a word strap was 11.2 mils. In the aforesaid practical embodiment, the word strap field was found to be substantially uniform throughout the width of a bit storage segment, resulting in output signals of relatively high amplitude. The word drive efficiency of the memory system was found to be materially improved over prior art memories having single turn word straps, while the fringe fields formed on either side of the word straps were of a low value to permit a closer inter-strap spacing and a consequently increased bit storage capacity.

While in accordance with the provisions of the statutes, there has been illustrated and described, the best form of the invention known, it will be apparent to those skilled in the art that changes may be made in the apparatus described without departing from the spirit of the invention as set forth in the appended claims. For example, while the preferred embodiment of the present invention employs a single-plane memory, it may be desirable, in certain instances, to provide a multi-plane memory array. In such a case, the word strap web may be folded in a succession of U-shaped forms, i.e. in a generally S-shaped configuration having segments thereof positioned between adjacent bit wire planes. The word strap conductors need not be etched upon the web, but may be formed thereon by any convenient means. In addition, the bit wires need not necessarily be of circular cross section but may take other forms. For example, they may consist of electrically conductive bars with the magnetic material formed thereon. Alternatively, the bit wires may consist of hollow rods, conductive or non-conductive, having a magnetic film thereon and having a conductive wire threaded therethrough. It will also become apparent that, in some cases, certain features of the invention may be used to advantage without a corresponding use of other features.

Having now described the invention, what is claimed as new and novel and for which it is desired to secure by Letters Patent is:

1. In a magnetic memory, a plurality of parallel bit wires each having a surrounding layer of magnetic material, said wires being supported in at least one common plane;

a plurality of successively spaced pairs of parallel conductors of predetermined width disposed to define a common, substantially U-shaped surface enveloping said plane and uniformly spaced therefrom, each conductor pair being arranged to form a continuous two-turn loop about said wires perpendicular thereto and defining a separate storage segment on the magnetic layer surrounding each wire, the axial length of each storage segment being a function of said width and of the mutual conductor spacing within each loop;

means for energizing said loops;

said conductor width bearing a predetermined relationship to said mutual spacing within each loop and to said uniform spacing from said wires to provide a substantially uniform, concentrated magnetic field confined to the length of each storage segment corresponding to an energized loop.

2. A memory comprising:

a plurality of electrically conductive digit wires each having an anisotropic magnetic film plated on the surface thereof;

a non-conductive support member adapted to retain said plated wires in spaced, parallel relationship in a common axial plane;

means for applying current pulses in either direction through each of said digit wires, means for sensing the polarity of signals induced in each of said digit wires;

a word strap assembly comprising a substantially U-shaped non-conductive web having a plurality of successively spaced pairs of parallel conductors formed on the surface thereof;

each of said conductors being rectangular in cross section and having a width B;

paired ones of said conductors having a center-to-center spacing D;

said word strap assembly enveloping said support member whereby each of said conductors pairs orthogonally surrounds all of said digit wires to define discrete data storage segments on said magnetic film thereon;

each of said conductors having a mean separation E from the axis of said digit wires;

means for serially connecting the conductors within each of said pairs to form a plurality of two-turn word straps;

each of said paired conductors of a word strap having their width B, their center-to-center spacing D and their means separation from said plated wires E related in accordance with the equation $D=\sqrt{B^2+4E^2}$;

and means for applying a current pulse to a selected one of said two-turn word straps;

whereby a uniform, concentrated, magnetic field is established confined to the data storage elements corresponding to each pulsed word strap.

3. In a magnetic memory, the combination of a plurality of parallel bit wires each surrounded by an anisotropic magnetic material and supported in at least one common plane;

a substantially U-shaped web carrying successively spaced pairs of flat parallel conductors, each of which is of substantially rectangular cross section and has a predetermined width and extends the length of said web;

said web enveloping said plane such that said conductors are disposed at right angles to said wires and are uniformly spaced from the latter;

each of said conductor pairs defining a storage segment on the magnetic material surrounding each of said enveloped wires;

means for connecting said conductors within each pair thereof in series; and means for energizing selected ones of said series-connected conductor pairs;

the width of said conductors being designated dimension B and bearing a predetermined relation to the mutual spacing of the conductors within each pair thereof as measured center to center in each conductor pair and being designated dimension D, and to the uniform spacing of said conductors from said wires which spacing constitutes the mean separation therebetween and is designated dimension E;

said relationship being such as to provide a substantially uniform, concentrated magnetic field confined to each storage element associated with an energized pair of conductors and being given by $D=\sqrt{B^2+4E^2}$.

4. In a plated wire magnetic memory having at least one rod-like conductor having a surrounding layer of anisotropic magnetic material having an easy axis of magnetization transverse to a hard axis of magnetization, and plural word straps of substantially rectangular cross-section, each of which is disposed to extend above and below said conductor uniformly spaced therefrom, and has a width measured along the length of said conductor which is materially larger than the thickness thereof measured transverse to said length;

the improvement wherein pairs of adjacent word straps are connected in series with each other to form a two-turn word strap, each of which couples with a different single data-storage segment of said magnetic material; and said word straps in each pair thereof are so spaced from said magnetic material, and so spaced apart, and have such a strap width and thickness, that current applied to said pair of series-connected straps produces a magnetic field having an intensity which has a substantially uniform non-zero value along the length of said magnetic material about which said pair of straps extends and which decreases from said value towards zero at a short distance, relative to the magnitude of said non-zero field, along said material from said length thereof.

References Cited

UNITED STATES PATENTS

| | | | |
|---|---|---|---|
| 3,175,200 | 3/1965 | Hoffman et al. | 340—174 |
| 3,413,621 | 11/1968 | Maeda | 340—174 |
| 3,223,985 | 12/1965 | Bittman et al. | 340—174 |
| 3,371,326 | 2/1968 | Fedde | 340—174 |

BERNARD KONICK, Primary Examiner

GARY M. HOFFMAN, Assistant Examiner